United States Patent
Pearson et al.

(10) Patent No.: US 8,982,776 B1
(45) Date of Patent: *Mar. 17, 2015

(54) INCREASING ACCURACY FOR DELIVERING PRECISION TIME PROTOCOL FREQUENCY AND PHASE SYNCHRONIZATION OVER A NETWORK WITHOUT ON-PATH SUPPORT

(71) Applicant: Sprint Communications Company, L.P., Overland Park, KS (US)

(72) Inventors: Timothy Hugh Pearson, Overland Park, KS (US); Steven Kenneth Guthrie, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/868,642

(22) Filed: Apr. 23, 2013

(51) Int. Cl.
*H04B 7/212* (2006.01)
*H04J 3/06* (2006.01)
*H04W 56/00* (2009.01)

(52) U.S. Cl.
CPC .................. *H04W 56/0065* (2013.01)
USPC ............................ 370/324; 370/350; 370/503

(58) Field of Classification Search
USPC .......................... 370/324, 350, 503
See application file for complete search history.

(56) References Cited

U.S. PATENT DOCUMENTS

| | | | |
|---|---|---|---|
| 8,416,763 B1* | 4/2013 | Montini et al. | 370/350 |
| 2006/0251084 A1* | 11/2006 | Elliot | 370/398 |
| 2007/0041324 A1* | 2/2007 | Shenoi | 370/235 |
| 2011/0150008 A1* | 6/2011 | Le Pallec et al. | 370/503 |
| 2012/0057865 A1* | 3/2012 | Hasegawa et al. | 398/16 |
| 2013/0039359 A1* | 2/2013 | Bedrosian | 370/350 |
| 2013/0315265 A1* | 11/2013 | Webb et al. | 370/516 |
| 2014/0064303 A1* | 3/2014 | Aweya et al. | 370/509 |

* cited by examiner

*Primary Examiner* — Brandon Renner

(57) ABSTRACT

Systems, methods, and computer-readable media for improving accuracy for providing precision time protocol (PTP) frequency and phase synchronization to each unanchored small cell site in a cluster over non on-path supported networks are provided. In embodiments, the method includes continuously measuring one-way delay down (OWDd) and delay offset down from a host site to an anchored site and one-way delay up (OWDu) and delay offset up from the anchored site to the host site. Round trip (RT) delay from the host site to each unanchored site is continuously measured. A one-way delay down prime (OWDd') is determined for each unanchored site by applying the ratio of OWDu/OWDd to the corresponding RT delay for each unanchored small cell site. An adjusted dynamic corrective offset (DCO) is determined for each unanchored site by adding the respective OWDd' to the respective time stamp and the delay offset down.

19 Claims, 7 Drawing Sheets

| HOST CLOCK 402 | UNANCHORED CLOCK 404 | DCO | CORRECTIVE OFFSET | OFFSET CORRECTED TIME |
|---|---|---|---|---|
| 410~22 | 101 | | | |
| 23 | 102 | | | |
| 24 | 103~420 | 422~24 | 424~-79 | 426~24 |
| 25 | 25 | | | 25 |
| 26 | 26 | | | 26 |
| 27 | 27 | | | 27 |
| 28 | 28 | | | 28 |
| 430~27 | | | | |
| 28 | | | | |
| 29 | 29~440 | 442~29 | 444~0 | 29~446 |
| 30 | 30 | | | 30 |
| 31 | 31 | | | 31 |

INCREASING ACCURACY FOR DELIVERING PRECISION TIME PROTOCOL FREQUENCY AND PHASE SYNCHRONIZATION OVER A NETWORK WITHOUT ON-PATH SUPPORT

CROSS REFERENCE TO RELATED APPLICATIONS

This application is a continuation-in-part of U.S. patent application Ser. No. 13/742,873, filed on Jan. 13, 2013 and entitled "DELIVERING PRECISION TIME PROTOCOL FREQUENCY AND PHASE SYNCRHONIZATION OVER A NETWORK WITHOUT ON-PATH SUPPORT", the entirety of which is hereby incorporated by reference.

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, increasing the accuracy for providing precision time protocol (PTP) frequency and phase synchronization in asymmetric traffic-based networks without on-path support to unanchored sites. In embodiments, one-way delay down (OWDd) and delay offset down from a host site to an anchored site and one-way delay up (OWDu) and delay offset up from the anchored site to the host site are continuously measured. A respective round trip (RT) delay from the host site to each unanchored small cell site in a cluster is continuously measured. A respective one-way delay down prime (OWDd') is determined for each unanchored small cell site by applying the ratio of OWDu/OWDd to the respective RT delay. A respective adjusted dynamic corrective offset (DCO) is determined for each unanchored small cell site by adding the respective OWDd' to the respective time stamp and the delay offset down. In embodiments, the respective adjusted DCO is applied to PTP messages communicated from the host site to each unanchored small cell site.

BRIEF DESCRIPTION OF THE SEVERAL VIEWS OF THE DRAWINGS

Illustrative embodiments of the present invention are described in detail below with reference to the attached drawing figures, and wherein:

FIG. 4A is a one-step synchronization diagram depicting an illustrative one-step method for providing frequency and phase synchronization to unanchored sites over on-path supported networks, utilizing a host and anchored clock, in accordance with embodiments of the invention;

DETAILED DESCRIPTION

Figure 1:
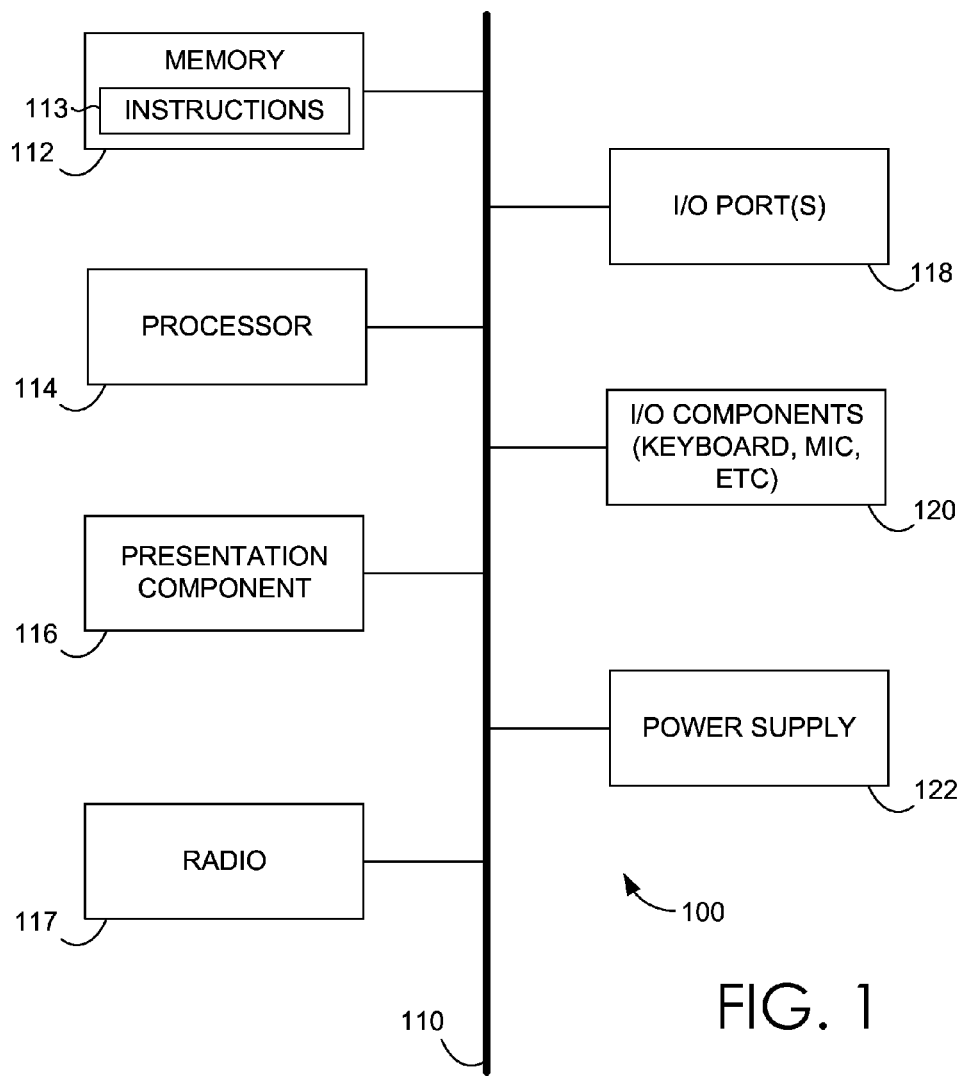
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

To address gaps in macro-network coverage (e.g., in buildings), to provide additional network capacity in congested areas, and for other reasons, macro-network service providers have begun installing and using devices referred to herein as small cells, which may also be referred to as femtocells, picocells, microcells, low-cost internet base stations (LCIBs), and by other names. Note that the aforementioned terms that end in "cell" may also be generally and herein used to refer to the coverage area provided by the respective device. Note also that "low-cost" is not used as a limiting term; that is, devices of any cost may be categorized as LCIBs, though most LCIBs typically will be much less expensive on average than most macro-network base stations.

A typical small cell may be approximately the size of a desktop phone or WiFi access point, and is essentially a low-power, low-capacity version of a macro base station. Thus, a typical small cell will use a normal power outlet, perhaps with a transformer providing a DC power supply. The small cell may have a wired (e.g., Ethernet) or wireless (e.g., WiFi) connection with the user's router, and would thus have connectivity to the Internet and/or one or more other packet-data networks via the user's broadband connection. A small cell may establish a virtual-private-network (VPN) connection over the Internet with an entity (e.g., a VPN terminator) on the wireless-service (macro-network) provider's core network, and thereby be able to securely communicate via the VPN terminator with other entities on that core network and beyond.

The small cell also has a wireless-communication (e.g., LTE or CDMA) interface that is compatible with the user's mobile station(s), such that the small cell may act as a micro base station, providing coverage on the wireless-service provider's network via the user's Internet connection. Usually, a small cell will provide service on a single RF carrier (or on a single carrier per technology, where multiple technologies (e.g., 1×RTT and EV-DO) are supported), and also transmit what is known as a pilot beacon, which includes administrative messages and parameters that mobile stations use to connect with the small cell.

In typical macro network implementations, Global Positioning System (GPS) receivers are installed at every macro base station for frequency and phase synchronization. But in the case of small cell deployment, synchronization may be problematic. In a Long Term Evolution (LTE) network, Coordinated Multi-point (CoMP) is needed for interference mitigation of small cells which are in close proximity to each other. Accordingly, CoMP requires extremely tight phase synchronization. Synchronization, as used herein, refers to the technique applied to ensure the radios in LTE small cell base stations are operating within specific performance parameters. Currently, the costs of deploying small cells with a GPS receiver are cost prohibitive. Further, locating small cells with GPS accessibility is not always possible.

Precision Time Protocol (PTP) IEEE-1588v2 supports both unicast and multicast messages to synchronize clocks thought a telecommunication network. PTP provides for frequency and phase synchronization, but to produce acceptable results requires some form of on-path support because dynamic asymmetric traffic-based networks vary in bidirectional delay. Such on-path support mechanisms are typically in the form of boundary and/or transparent clocks. This approach is generally effective in new installations (i.e., green-field approach), however is impractical and costly for existing networks (i.e., brown-field approach).

In simplified PTP systems, a grandmaster clock performs a discovery of all slave clocks and the synchronization alignment starts with the grandmaster clock. High precision is needed for telecom networks; therefore, PTP clock accuracy of sub-microsecond range is possible when the network traffic is fairly symmetric and has low delay. However, in packet-based networks, particularly in public IP networks, the traffic may be asymmetric and may have bursts of traffic which causes periods of higher delay. On-path support in the network helps mitigate the delay and filters out clocking noise, but IP public networks do not have clocking support.

Normally, slave clock manufacturers use a variety of proprietary methods and algorithms for determining useful PTP packets (i.e., packets that have reached their destination without undue delay). These slaves may achieve clock accuracy between the master and slave in the hundreds of nanoseconds. However, low Packet Delay Variation (PDV) and symmetry is necessary to produce extremely tight phase synchronization. In networks without on-path support, accuracy and locking of phase is not possible. Further exacerbating this problem is that many networks utilized by wireless providers are under other's control. Still further, each small cell site may have slightly different delay characterization. These slight differences may be caused by processing differences from edge to edge routers or switches. Unfortunately, even slight differences may prevent a particular small cell site from obtaining the correct frequency and phase synchronization.

Embodiments of the present invention are directed to improving accuracy for providing PTP frequency and phase synchronization to each unanchored small cell site in a cluster (e.g., small cell sites without GPS functionality) in asymmetric networks without PTP on-path support. In embodiments, one-way delay down (OWDd) and delay offset down from a host site to an anchored site and one-way delay up (OWDu) and delay offset up from the anchored site to the host site are continuously measured. Round trip (RT) delay from the host site to each unanchored small cell site in a cluster is continuously measured. A one-way delay down prime (OWDd') is determined for each unanchored site by applying the ratio of OWDu/OWDd to the corresponding RT delay for each unanchored small cell site. A respective adjusted dynamic corrective offset (DCO) is determined for each unanchored small cell site by adding the respective OWDd' for to the respective time stamp and the delay offset down. In embodiments, the respective adjusted DCO is applied to PTP messages communicated from the host site to the each unanchored small cell site in the cluster.

Accordingly, in one aspect, embodiments of the present invention are directed to one or more computer-readable storage media having computer-executable instructions embodied thereon that, when executed by a computing device, cause the computing device to facilitate a method for determining an adjusted dynamic corrective offset for each unanchored small cell site in a cluster. The method comprises: continuously measuring, in an asymmetric network without on-path support, one-way delay down (OWDd) and delay offset down from a host site to an anchored site and one-way delay up (OWDu) and delay offset up from the anchored site to the host site; continuously measuring a respective round trip (RT) delay from the host site to each unanchored small cell site in a cluster; determining a respective one-way delay down prime (OWDd') for each unanchored small cell site in the cluster by applying the ratio of OWDu/OWDd to the respective RT delay for each unanchored small cell site in the cluster; and determining a respective adjusted dynamic corrective offset (DCO) for each unanchored small cell site in the cluster by adding the respective OWDd' to the sum of a respective point in time and the delay offset down.

In another aspect, embodiments of the present invention are directed to a method for determining an adjusted dynamic corrective offset for each unanchored small cell site in a cluster. The method comprises: continuously measuring, in an asymmetric network without on-path support, one-way delay down (OWDd) and delay offset down from a host site to an anchored site and one-way delay up (OWDu) and delay offset up from the anchored site to the host site; continuously measuring a respective round trip (RT) delay from the host site to each unanchored small cell site in a cluster; determining a respective one-way delay down prime (OWDd') for each unanchored small cell site in the cluster by applying the ratio of OWDu/OWDd to the respective RT delay for each unanchored small cell site in the cluster; and determining a respective adjusted dynamic corrective offset (DCO) for each unanchored small cell site in the cluster by adding the respective OWDd' to the sum of a respective point in time and the delay offset down.

In yet another aspect, embodiments of the present invention are directed to a computer system for determining an adjusted dynamic corrective offset for each unanchored small cell site in a cluster. The computer system comprises a processor coupled to a computer-storage medium, the computer-storage medium having stored thereon a plurality of computer software components executable by the processor. The computer software components comprise: a delay component for continuously measuring, in an asymmetric network without on-path support, one-way delay down (OWDd) and delay offset down from a host site to an anchored site and one-way delay up (OWDu) and delay offset up from the anchored site to the host site to determine a respective adjusted dynamic corrective offset (DCO) for each unanchored small cell site in a cluster, wherein each of the host site and the anchored site has a Primary Reference Timing Clock (PRTC) that is traceable and synchronous to a common clock; a round trip component for continuously measuring a respective round trip (RT) delay from the host site to each unanchored small cell site in the cluster; an application component for applying the respective adjusted DCO to PTP messages communicated from the host site to each unanchored small cell site in the cluster; and a sync component for communicating, to each unanchored small cell site in the cluster, a PTP sync message that indicates a respective point in time the PTP sync message is communicated from the host site.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
    4G Fourth-Generation Wireless Telephone Technology
    CDMA Code Division Multiple Access
    CD-ROM Compact Disk Read Only Memory
    CoMP Coordinated Multi-Point
    CRM Customer Relations Management
    CSR Cell Site Router
    DVD Digital Versatile Discs
    EEPROM Electrically Erasable Programmable Read Only Memory
    ENODEB Evolved Node B
    GPRS General Packet Radio Service
    GPS Global Positioning System
    GSM Global System for Mobile Communications
    HLR Home Location Register
    iDEN Integrated Digital Enhanced Network
    IP Internet Protocol
    LTE Long Term Evolution
    MSC Mobile Serving Center
    MMS Multimedia Messaging Service
    PDV Packet Delay Variation
    PC Personal Computer
    PCS Personal Communications Service
    PDA Personal Digital Assistant
    PLMN Public Land Mobile Network
    PRTC Primary Reference Timing Clock
    PTP Precision Time Protocol
    RAM Random Access Memory
    RF Radio Frequency
    ROM Read Only Memory
    SIB2 SystemInformationBlockType2
    SLA Service Level Agreement
    SMS Short Message Service
    TDMA Time Division Multiple Access
    UCT Coordinated Universal Time
    UMTS Universal Mobile Telecommunications Systems
    VoIP Voice over IP
    WAN Wide Area Network
    Wi-Fi Wireless Fidelity
    WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include LTE, WiMAX, CDMA, GPRS, TDMA, GSM, Wi-Fi and the like. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
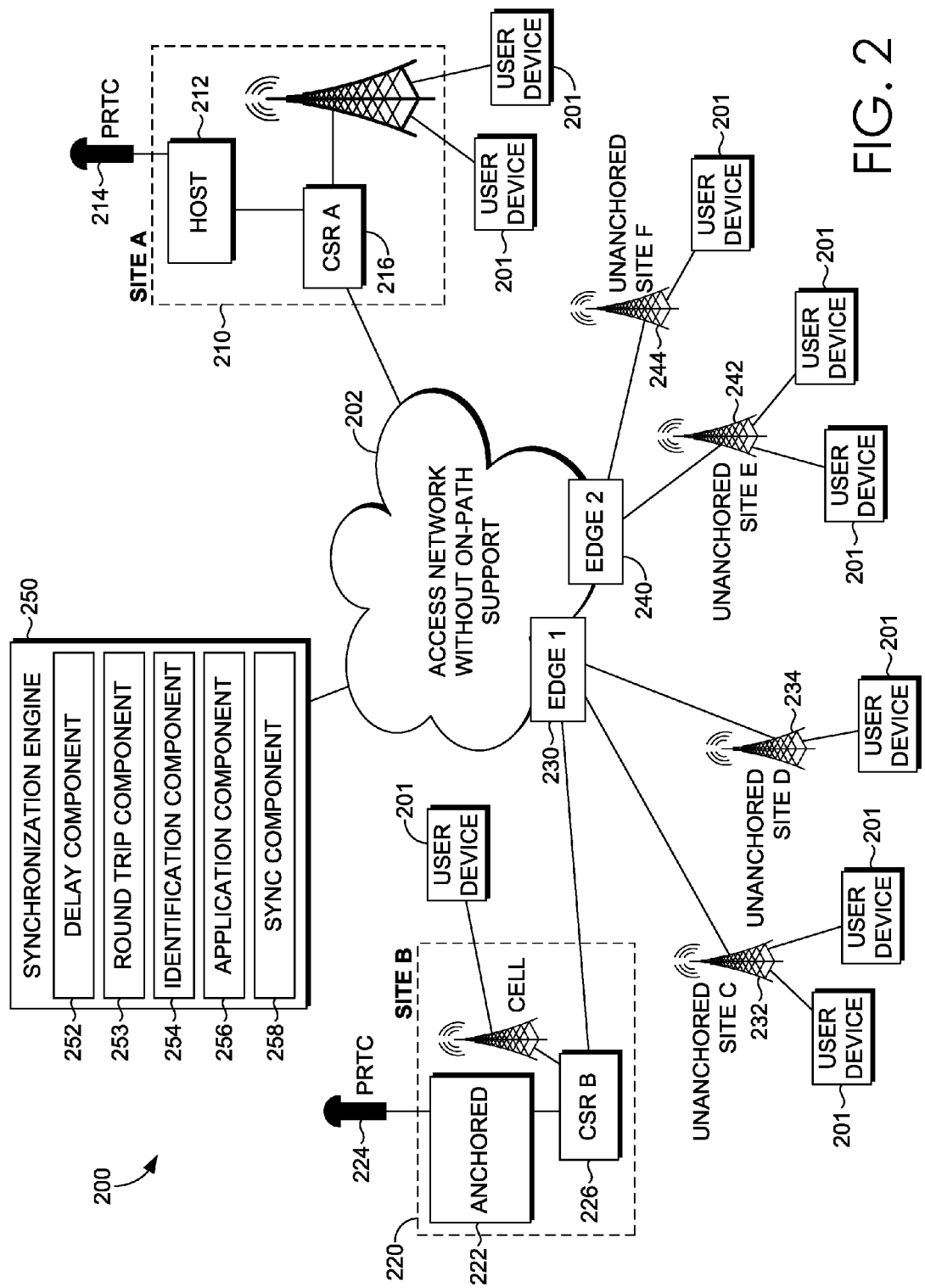
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, network 202 enables communication between user devices 201 (e.g., mobile devices 100, servers, a personal computers, etc.). User devices 201 may take on a variety of forms, such as a personal computer (PC), a laptop computer, a tablet, a netbook, a mobile phone, a smart phone, a personal digital assistant (PDA), or any other device that is cable of communicating with other devices. For example, the user device 201 can take on any form, such as a mobile device 100 or any other computing device capable of wirelessly communicating with the other devices using the network. Makers of illustrative devices include, for example, Research in Motion, Creative Technologies Corp., Samsung, Apple Computer, and the like. A user device 201 can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device 201 can be any mobile computing device that communicates by way of, for example, a 3G or 4G network.

In embodiments, the network 202 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 202 can include multiple networks, as well as being a network of networks, but is shown in more simple form so as to not obscure other aspects of the present invention. The network 202 can be part of a telecommunication network that connects subscribers to their immediate service provider. In embodiments, the network 202 can be associated with a telecommunications provider that provides services to user devices 201. For example, the network 202 may provide voice services to user devices 201 or corresponding users that are registered or subscribed to utilize the services (e.g., the network 202) provided by a telecommunications provider. The network 202 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In embodiments, the network 202 is comprised of one or more edges (e.g., Edge 1 230 and Edge 2 240). The unanchored sites 232, 234, 242, 244 in the cluster and an anchored site 220 may be supported by one or more edges 230, 240. The unanchored sites 232, 234, 242, 244 in the cluster and anchored site 220 may be small cell sites which provide additional capacity and extend the range of the network 202 beyond what may be provided by a traditional macro cell tower. In one embodiment, the network 202 is an asymmetric network without PTP on-path support (e.g., public IP network). In other words, in one embodiment, the network 202 is not supported with transparent and/or boundary clocks. In one embodiment, the network 202 is an asymmetric network with PTP partial on-path support (e.g., one node includes a transparent clock).

The anchored site 220 is the only edge-supported site deployed with a PRTC 224 which is traceable and synchronous to a common clock. In one embodiment, the common clock is Coordinated Universal Time (UTC). In one embodiment, the PRTC 224 is a GPS receiver. This greatly reduces the costs associated with deploying edge-supporting small cell sites (i.e., the unanchored sites) and allows for deploying a GPS receiver at the edge-supporting site (e.g., LTE Pico cell) with the best available GPS line-of-sight. In one embodiment, one or more of the unanchored sites that are not deployed with an external clock that is traceable and synchronous to a common clock is deployed in an in-building environment. In one embodiment, more than one anchored site is deployed in a network 202 to support distinct edges associated with the network 202.

Host site 210 is also deployed with a PRTC 214, which is traceable and synchronous to a common clock. The host site 210 may be, for example, a macro cell found in a typical telecommunications network. In one embodiment, the PRTC is a GPS receiver. Each of the PRTCs 214, 224 allow for identical time synchronization between the host clock 212 and the anchored clock 222. This also allows for a very accurate measurement of OWDd and OWDu from the host site 210 to the anchored site 220. The RT delay can also be accurately measured from the host site 210 to each unanchored small cell site 232, 234, 242, 244 in the cluster. The known asymmetric ratio of OWDu/OWDd over the host site 210 to the anchored site 220 may be applied to each unanchored small cell site's RT delay to determine a respective OWDd'. The respective OWDd' can then be used to modify, as discussed herein, a typical PTP packet to synchronize each of the unanchored small cell sites 232, 234, 242, 244 in the cluster by using the standard PTP approach of one-way or two-way frequency only messaging. In one embodiment, a cell site router (CSR) 216, 226 aggregates the IP traffic within the cell site.

The unanchored sites 232, 234 242, 244 are usually positioned in clusters. The clusters may be located in an office building, a shopping mall, a stadium, or any other indoor or outdoor location to provide additional capacity or extended coverage to a macro network. The anchored site 220 may also be a small cell included as part of the cluster, with the location of the anchored site determined based on the availability of a GPS signal. The host site 210 may be a macro cell in a telecommunications network. The host site 210 will typically be the macro cell in proximity to the cluster, but remote host sites may also be used. In one embodiment, a host site 210 synchronizes with multiple clusters. In one embodiment, each cluster represents comprises one or more anchored sites and one or more associated unanchored sites. In one embodiment, the host site identifies a unique or separate adjusted DCO for each unanchored site in the cluster. For example, an office building may have a plurality of small cells with an anchored site and one or more unanchored sites. Each of the plurality of small cells may have a unique adjusted DCO. Similarly, office buildings in the proximate area will each have their own cluster of small cells. Each of the small cells in these clusters may have a unique adjusted DCO. A macro cell in the proximate area of the office buildings may serve as the host site 210 for a plurality of clusters.

In implementation, each of the sites is associated with a synchronization engine 250 that is utilized to provide PTP frequency and phase synchronization to unanchored sites over NoPS networks. The synchronization engine 250 includes, in various embodiments, delay component 252, roundtrip component 253, identification component 254, application component 256, and sync component 258. Although each of these components are illustrated as one synchronization engine 250 associated with the network 202, it should be appreciated that any or all of these components may be associated with any of the network elements, including host site 210 or the anchored site 220.

Delay component 252 continuously measures, in an asymmetric network without on-path support, OWDd and delay offset down from the host site 210 to the anchored site 220 and OWDu and delay offset up from the anchored site 220 to the host site 210 to determine a respective adjusted dynamic corrective offset (DCO) for each unanchored small cell site 232, 234, 242, 244 in a cluster, the respective adjusted DCO being unique for each unanchored small cell site in the cluster. In other words, because each unanchored small cell site may have a different RT delay, each unanchored small cell site may also have a different respective adjusted DCO. The delay offset down and the delay offset up account for processor time and/or additional delay required to align phase.

Round trip component 253 continuously measures a respective RT delay from the host site to each unanchored small cell site in the cluster. Because the network is asymmetric, it is often difficult, if not impossible, to determine the path required for communication between the host site 210 or anchored site 220 and each unanchored small cell site 232, 234, 242, 244 in the cluster. More particularly, a communication path with a particular unanchored small cell site may traverse more, less, or different routers than a communication path with another unanchored small cell site. Continuously measuring RT delay for each unanchored small cell site 232, 234, 242, 244 in the cluster allows for the determination of a more accurate adjusted DCO which, in turn, allows each unanchored small cell site 232, 234, 242, 244 in the cluster to correctly identify the correct PTP frames.

In one embodiment, identification component 254 uniquely identifies each site in the cluster, including both anchored and unanchored sites. The anchored site is the only site other than the host site that is deployed with a PRTC, which is traceable and synchronous to a common clock (e.g., UTC). Further, no boundary or transparent clocks are utilized in the PTP synchronization transport link or path. In one embodiment, each of the unanchored sites and anchored sites is identified by media access control (MAC) address. In one embodiment, each of the unanchored sites and anchored sites is identified by internet protocol (IP) address.

Application component 256 applies the respective adjusted DCO to PTP messages communicated from the host site to each unanchored small cell site in the cluster. As can be appreciated, in a public IP network, the adjusted DCO varies over time for each unanchored small cell site in the cluster based on a variety of factors, including the path distance, the path elements, and the path size required to reach each individual unanchored small cell site from the host site. By continuously measuring the OWDd, the OWDu, the RT delay, the delay offset up, and the delay offset down, the respective adjusted DCO can be individually (i.e., on a per unanchored small cell site basis) and frequently updated as necessary to maintain integrity in the clock synchronization process despite not having an external clock in any of the unanchored sites. In other words, the respective adjusted DCO allows the clocks associated with each of the unanchored small cell sites 232, 234, 242, 244 and the anchored site 220 to synchronize with the clock associated with the host site despite the absence of an external UTC traceable clocking source at unanchored sites 232, 234, 242, 244. Further, the respective adjusted DCO allows the clocks associated with each of the unanchored small cell sites 232, 234, 242, 244 and the anchored site 220 to synchronize with the clock associated with the host site despite the absence of an understanding of routing between each of the unanchored small cell sites 232, 234, 242, 244 and the anchored site 220 or host site 210.

In one embodiment (i.e., the one-step synchronization process), rather than communicating a PTP follow-up message, sync component 258 communicates, to the each unanchored small cell site in a cluster, a PTP sync message from the host site that indicates a respective point in time the PTP sync message is communicated form the host site. The PTP sync message also indicates the respective adjusted DCO in the {correction_field} of the PTP sync message.

In the one-step synchronization process embodiment, the two-step flag is set to false and a PTP follow-up message is not required. The respective adjusted DCO comprises a sum of the respective point in time, a respective OWDd', and the delay offset down. The respective OWDd' is determined for each unanchored small cell site in the cluster by applying the ratio of OWDu/OWDd to the respective RT delay. A respective corrective offset is determined for each unanchored small cell site in the cluster by subtracting the respective unanchored small cell site clock time at the respective receipt of the PTP synch message from the respective adjusted DCO. A respective offset correct time for each unanchored small cell site is then established by adding the respective corrective offset to the respective unanchored small cell clock time.

In one embodiment (i.e., the two-step synchronization process), sync component 258 communicates, to each unanchored small cell site in a cluster, a PTP sync message from the host site that indicates a respective point in time (i.e., a time stamp) the host site sent the sync message. Since the two-step flag is set to true, the {message_field} is ignored, in one embodiment, by each unanchored small cell site in the cluster. In this embodiment, sync component 258 further communicates, to each unanchored small cell site in the cluster, a PTP follow-up message from the host site that indicates the respective adjusted DCO in the {value_field} of the PTP follow-up message. The PTP sync message is received by each unanchored small cell site at a respective second point in time. The PTP follow-up message is received by each unanchored small cell site at a respective third point in time.

In the two-step synchronization process embodiment, the respective adjusted DCO comprises a sum of the respective point in time, a respective OWDd', and the delay offset down. The respective OWDd' is determined for each unanchored small cell site in the cluster by applying the ratio of OWDu/OWDd to the respective RT delay. A respective corrective offset is determined for each unanchored small cell site in the cluster by subtracting the respective adjusted DCO from the respective second point in time and a respective offset corrected time is determined for each unanchored small cell site in the cluster by adding the respective corrective offset to the respective third point in time.

Figure 3:
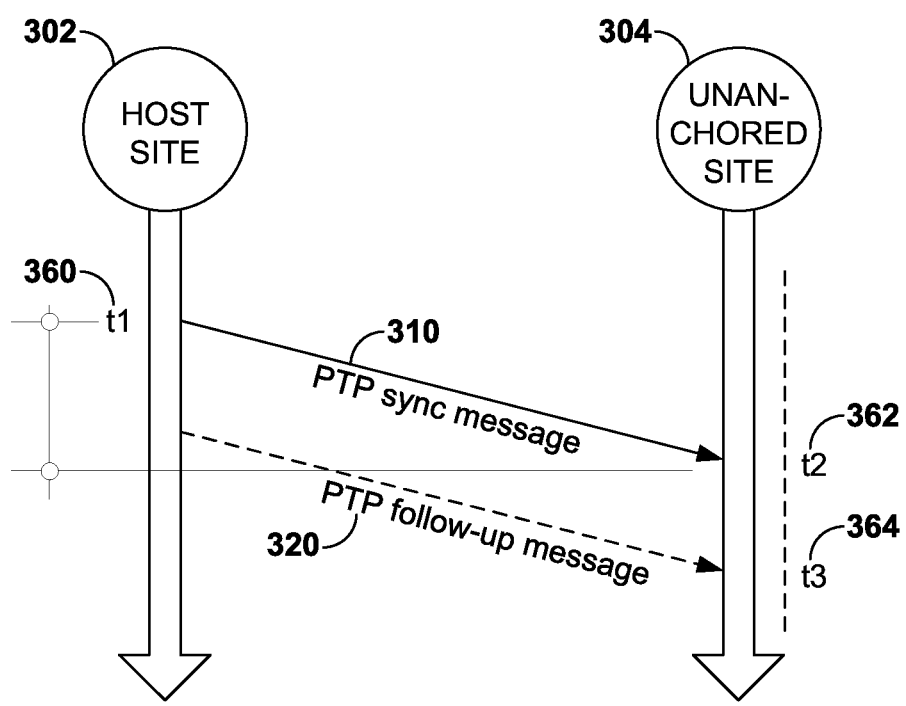
FIG. 3 is a diagram depicting an illustrative method for providing frequency and phase synchronization to unanchored sites over on-path supported networks, utilizing a host and anchored clock, in accordance with embodiments of the invention.

Referring now to FIGS. 2 and 3, in one embodiment, sync component 258 communicates, to the identified unanchored site 304, a PTP sync message 310 from the host site 302 that indicates a point in time 360 to an unanchored small cell site 304. In one embodiment, the two-step value is set to false (i.e., only sync message is sent), and the adjusted DCO is included in the {correction_field} of the PTP sync message. In one embodiment, the two-step value is set to true (i.e., sync and follow-up) and that point in time is ignored by the unanchored small cell site. The PTP sync message 310 is received by the unanchored small cell site 304 at a second point in time 362. In one embodiment, a follow-up message 320 from the host site 302 is communicated to the unanchored small cell site 304 indicating the adjusted DCO. The PTP follow-up message 320 is received by the unanchored small cell site 304 at a third point in time 364.

In implementation, and referring to FIG. 4A, a one-step synchronization diagram depicts PTP frequency and phase synchronization for each unanchored small cell site in a cluster over NoPS networks, utilizing a host and anchored clock, in accordance with embodiments of the invention.

At host clock 402 time twenty-two 410, a PTP sync message 412 is sent that includes a time stamp indicating a respective point in time the host clock communicates the PTP message. In this example, the time stamp corresponds to the host clock time of twenty-two 410. In one embodiment, the respective adjusted DCO is communicated as a value in the {correction_field} of the PTP sync message. The respective adjusted DCO comprises the sum of the time stamp, the OWDd', and the delay offset down (e.g., processor time and/or additional delay required to align phase). In this example, the OWDd' is 2 and delay offset down are 0. Thus, the sum of the time stamp (e.g., 22), the OWDd' (e.g., 2), and the delay offset down (i.e., 0) results in a respective adjusted DCO of twenty-four 422. The respective corrective offset 424 is calculated by subtracting the respective unanchored time 420 (e.g., 103) at the receipt of the PTP sync message from the respective adjusted DCO 422 (e.g., 24). In this example, the respective corrective offset 424 is negative seventy-nine.

The respective offset corrected time for the unanchored clock 404 is then established by adding the respective corrective offset 424 (e.g., −79) to the respective unanchored clock time 420 (e.g., 103). In this example, the respective offset corrected time is twenty-four 426. This process repeats to maintain frequency and phase synchronization with the host clock 402.

For example, the next PTP sync message 432 is communicated with a respective time-stamp indicating the host clock time of twenty-seven 430. The respective adjusted DCO is communicated as a value in the {correction_field} of the PTP sync message and comprises the sum of the time stamp (e.g., 27), the respective OWDd', and the delay offset down. In this example, the sum of the respective OWDd' and the delay offset down is still two resulting in a respective adjusted DCO of twenty-nine 442. The respective corrective offset 424 is calculated by subtracting the respective unanchored time 440 (e.g., 29) at the receipt of the PTP sync message from the respective adjusted DCO 442 (e.g., 29). In this example, the respective corrective offset 444 is zero.

The respective offset corrected time for the unanchored clock 404 is then established by adding the respective corrective offset 444 (e.g., 0) to the unanchored clock time 440 (e.g., 29). In this example, the respective offset corrected time is twenty-nine 446. This process repeats for each of the unanchored small cell sites in the cluster to maintain frequency and phase synchronization with the host clock 402. The respective offset corrected time is the synchronized time at the unanchored small cell site. As can be appreciated, this process is repeated any number of times for each unanchored small cell site in the cluster. As also can be appreciated, for any time delay changes associated with any of the unanchored small cell sites in the cluster, the clock associated with that particular unanchored small cell site will need to be corrected utilizing the above method.

Figure 4B:
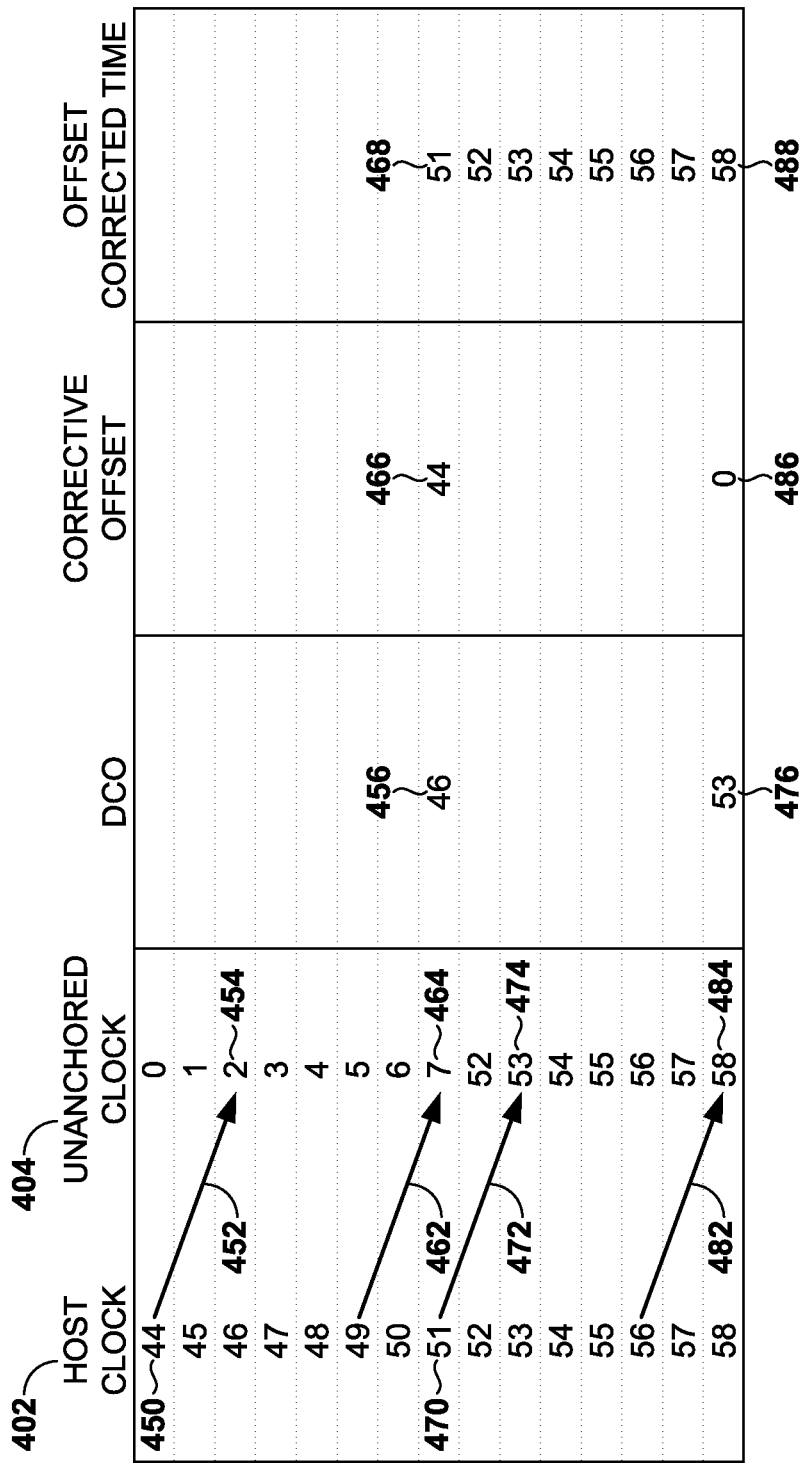
FIG. 4B is a two-step synchronization diagram depicting an illustrative two-step method for providing frequency and phase synchronization to unanchored sites over on-path supported networks, utilizing a host and anchored clock, in accordance with embodiments of the invention.

Referring now to FIG. 4B, a two-step synchronization diagram depicts PTP frequency and phase synchronization for unanchored small cell sites in a cluster over NoPS networks, utilizing a host and anchored clock, in accordance with embodiments of the invention. For purposes of this example, the respective OWDD' is two and the delay offset down is zero.

At host clock 402 time forty-four 450, a PTP sync message 452 is sent that includes a time stamp indicating a respective point in time the host clock communicates the PTP message (e.g., forty-four). In this example, the time stamp corresponds to the host clock time of forty-four 450 and is ignored by the unanchored small cell site. A follow-up message 462 is sent with the respective adjusted DCO which correlates to the same point in time as the PTP sync message 452. The respective adjusted DCO comprises the sum of the time stamp, the OWDd', and the delay offset down (i.e., processor time and/or additional delay required to align phase). In this example, the OWDd' is 2 and the delay offset down is 0. Thus, the sum of the respective time stamp (e.g., 44), the respective OWDd' (e.g., 2), the delay offset down (e.g., 0) results in a DCO of forty-six 456. Once the unanchored small cell site receives the follow-up message 462, the respective corrective offset 466 is computed for the unanchored clock 404. The respective corrective offset 466 is calculated by subtracting the unanchored time 454 (e.g., 2) at the receipt of the PTP sync message from the respective adjusted DCO (e.g., 46). In this example, the respective corrective offset 466 is forty-four.

The respective offset corrected time for the unanchored clock 404 is then established by adding the respective corrective offset 466 (e.g., 44) at the PTP follow-up message 462 to the unanchored clock time 464 (e.g., 7) when the PTP follow-up message 462 was received. In this example, the respective offset corrected time is fifty-one 468. This process repeats for each unanchored small cell site in the cluster to maintain respective frequency and phase synchronization with the host clock 402.

For example, the next PTP sync message 472 is sent at host clock time fifty-one 470. A PTP follow-up message 482 is also sent with a value of fifty-one. Utilizing the same respective OWDd' of two, the same delay offset down of zero, the respective adjusted DCO is calculated upon receiving the PTP follow-up message 484. In this example, the respective adjusted DCO is fifty-three 460. It should be appreciated, however, that the respective OWDd' is dynamic and may differ from the previous OWDd' associated with the PTP follow-up message 462. The respective corrective offset 486 is calculated by subtracting the unanchored time, fifty-three, at the receipt of the PTP sync message 472 (e.g., 424) from the respective adjusted DCO 476, also fifty-three. In this case the respective corrective offset 486 is zero. Finally, the respective offset corrected time for the unanchored clock 404 is calculated by adding the respective corrective offset 486 to the unanchored clock time 484 (e.g., 58) when the PTP follow-up message is received. In this example, zero is added to fifty-eight, making the respective offset corrected time fifty-eight. The respective offset corrected time is the synchronized time at the unanchored site. As can be appreciated, this process is repeated any number of times. As also can be appreciated, any time delay changes, the unanchored clock will need to be corrected utilizing the above method.

Figure 5:
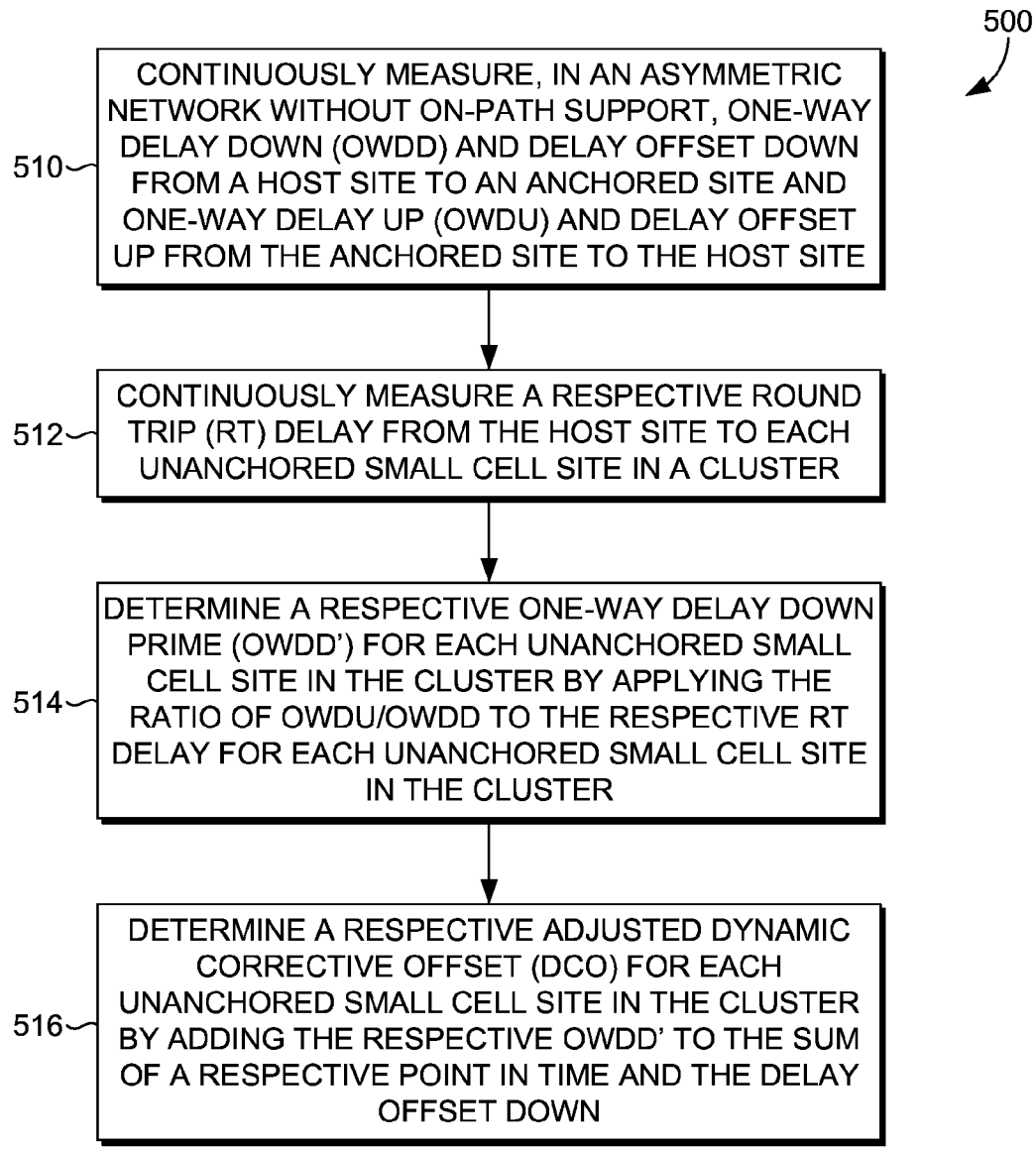
FIG. 5 is a flow diagram depicting an illustrative method for increasing the accuracy for providing PTP frequency and phase synchronization to unanchored sites over a network without on-path support, in accordance with embodiments of the invention.

Referring now to FIG. 5, a flow diagram depicts a method 500 for increasing the accuracy for providing PTP frequency and phase synchronization to unanchored sites over NoPS networks, in accordance with embodiments of the invention. At step 510, in an asymmetric network without on-path support, OWDd and delay offset down is continuously measured from a host site to an anchored site and OWDu and delay offset up is continuously measured from the anchored site to the host site. The delay offset down or up comprises processor delay and any necessary delay to account for phase shift. In one embodiment, each of the host site and the anchored site has a PRTC that is traceable and synchronous to a common clock. In one embodiment, the common clock is UTC. In one embodiment, the PRTC is a GPS receiver.

Respective RT delay is continuously measured, at step 512, from the host site to each unanchored small cell site in a cluster. In one embodiment, each of the unanchored sites is identified by MAC address. In one embodiment, each of the unanchored sites is identified by IP address. In one embodiment, a cluster comprises one or more anchored sites and one or more associated unanchored sites proximately positioned to each other. In one embodiment, a single host site synchronizes with multiple clusters.

At step 514, a respective OWDd' is determined for each unanchored small cell site in the cluster by applying the ratio of OWDu/OWDd to the respective RT delay for each unanchored small cell site in the cluster. A respective adjusted DCO is determined, at step 516, for each unanchored small cell site in the cluster by adding the respective OWDd' for each unanchored small cell site in the cluster to the sum of a respective point in time and the delay offset down. In one embodiment, the respective point in time corresponds to a time stamp associated with a PTP message. In one embodiment, the respective adjusted DCO for each unanchored small cell site in the cluster is applied to PTP messages communicated from the host site to the respective unanchored small cell site.

In a one-step synchronization embodiment, a two-step flag is set to false, indicating that a one-step synchronization process should be followed. In this embodiment, applying the respective adjusted DCO for each unanchored site in the cluster to PTP messages comprises communicating, from the host site to the each unanchored small cell site in the cluster, a PTP sync message from the host site that indicates, in the {correction_field} of the PTP sync message, the respective adjusted DCO. In one embodiment, a respective offset corrected time for each unanchored small cell site in the cluster is determined by adding the respective point in time to the respective adjusted DCO.

In a two-step synchronization embodiment, a flag is set to true indicating that a two-step synchronization process should be followed and each unanchored small cell site waits for a PTP follow-up message from the host site. In one embodiment, a PTP sync message is communicated from the host site to each unanchored small cell site in the cluster that indicates a respective point in time the host site sent the PTP sync message. The PTP sync message is received at a respective second point in time. It is indicated, to each unanchored small cell site in the cluster, to ignore the respective point in time indicated in the PTP sync message. A follow-up message is communicated to each unanchored small cell site in the cluster indicating the respective adjusted DCO. The PTP follow-up message is received by each unanchored small cell site in the cluster at a respective third point in time.

In one embodiment, a respective corrective offset is determined for each unanchored small cell site in the cluster by subtracting the respective second point in time from the respective adjusted DCO. An offset corrected time is determined for each unanchored small cell site in the cluster by adding the respective corrective offset to the respective third point in time. As can be appreciated, this process is repeated any number of times to accommodate any changes in respective adjusted DCO over time.

Figure 6:
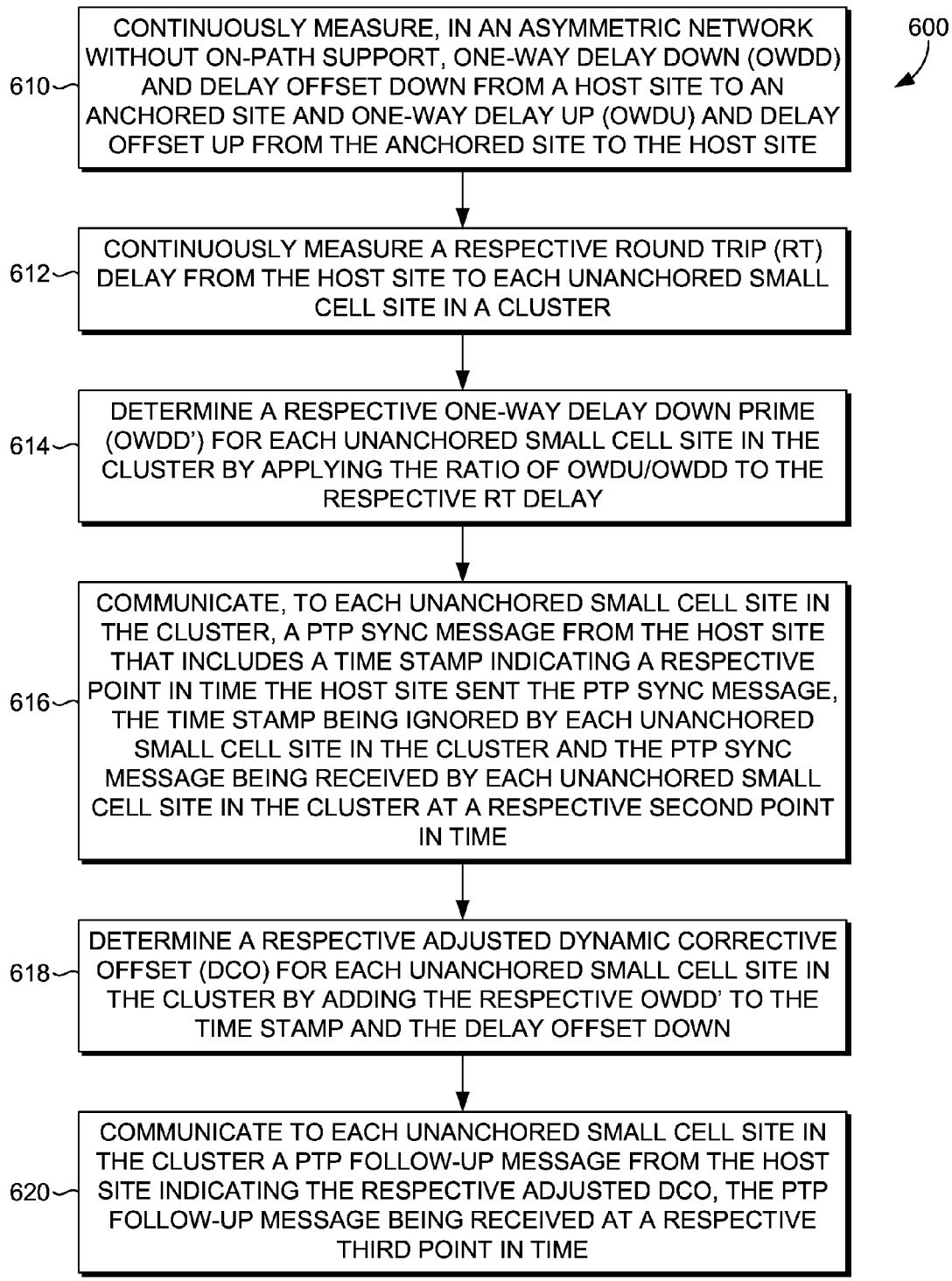
FIG. 6 is a flow diagram depicting an illustrative two-step method for increasing the accuracy for providing PTP frequency and phase synchronization to unanchored sites over a network without on-path support, in accordance with embodiments of the invention.

Referring now to FIG. 6, a flow diagram depicts an illustrative two-step method 600 for increasing the accuracy for providing PTP frequency and phase synchronization to unanchored sites over NoPS networks, in accordance with an embodiment of the present invention. Initially, at step 610, in an asymmetric network without on-path support, one-way delay down (OWDd) and delay offset down from a host site to an anchored site and one-way delay up (OWDu) and delay offset up from the anchored site to the host site are continuously measured. In one embodiment, each of the host site and the anchored site has a PRTC that is traceable and synchronous to a common clock. In one embodiment, the common clock is UTC.

At step 612, respective RT delay is continuously measured from the host site to each unanchored small cell site in a cluster. The unanchored sites do not include a PRTC that is traceable and synchronous to a common clock. Further, in one embodiment, no boundary or transparent clocks are utilized in the PTP synchronization process. In one embodiment, each of the unanchored sites is identified by MAC address. In one embodiment, each of the unanchored sites is identified by IP address.

At step 614, a respective one-way delay down prime (OWDd') is determined for each unanchored small cell site in the cluster by applying the ratio of OWDu/OWDd to the respective RT delay. A PTP sync message is communicated, at step 616, from the host site to each unanchored small cell site in the cluster. The PTP sync message includes a time stamp indicating a respective point in time the host site sent the PTP sync message. The time stamp is ignored by each unanchored small cell site in the cluster. The PTP sync message is received by each unanchored small cell site in the cluster at a respective second point in time.

At step 616, a respective adjusted DCO is determined for each unanchored small cell site in the cluster by adding the respective OWDd' to the time stamp and the delay offset down. A PTP follow-up message is communicated from the host site to each unanchored small cell site in the cluster at step 618. The PTP follow-up message indicates the respective adjusted DCO. The PTP follow-up message is received by each unanchored small cell site at a respective third point in time. In one embodiment, additional PTP sync and follow-up messages are sent in the same fashion to each unanchored small cell site to maintain PTP frequency and phase synchronization.

In one embodiment, a respective corrective offset is determined by subtracting the respective second point in time from the respective adjusted DCO. In one embodiment, a respective offset corrected time is determined for the each unanchored small cell site by adding the respective corrective offset to the respective third point in time. As can be appreciated, this process is repeated any number of times to accommodate PTP frequency and phase synchronization of the unanchored sites to the host.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer-readable media having computer-executable instructions embodied thereon that, when executed by one or more computing devices, cause the one or more computing devices to perform operations comprising:
   continuously measuring, in an asymmetric network without on-path support, one-way delay down (OWDd) and delay offset down from a host site to an anchored site and one-way delay up (OWDu) and delay offset up from the anchored site to the host site;

continuously measuring a respective round trip (RT) delay from the host site to each unanchored small cell site in a cluster;
determining a respective one-way delay down prime (OWDd') for each unanchored small cell site in the cluster by applying the ratio of OWDu/OWDd to the respective RT delay for each unanchored small cell site in the cluster; and
determining a respective adjusted dynamic corrective offset (DCO) for each unanchored small cell site in the cluster by adding the respective OWDd' to the sum of a respective point in time and the delay offset down.

2. The media of claim 1, wherein the respective point in time corresponds to a time stamp associated with a PTP message.

3. The media of claim 1, wherein each of the host site and the anchored site has a Primary Reference Timing Clock (PRTC) that is traceable and synchronous to a common clock.

4. The media of claim 1, further comprising applying the respective adjusted DCO for each unanchored small cell site in the cluster to PTP messages communicated from the host site to the respective unanchored small cell site.

5. The media of claim 4, wherein applying the respective adjusted DCO for each unanchored site in the cluster to PTP messages comprises:
communicating, to each unanchored small cell site in the cluster, a PTP sync message from the host site that indicates a respective point in time the host site sent the PTP sync message, the PTP sync message being received at a respective second point in time;
indicating, to each unanchored small cell site in the cluster, to ignore the respective point in time indicated in the PTP sync message; and
communicating to each unanchored small cell site in the cluster a follow-up message from the host site indicating the respective adjusted DCO, wherein the follow-up message is received by each unanchored small cell site in the cluster at a respective third point in time.

6. The media of claim 5, further comprising:
determining a respective corrective offset for each unanchored small cell site in the cluster by subtracting the respective adjusted DCO from the respective second point in time; and
determining a respective offset corrected time for each unanchored small cell site in the cluster by adding the respective corrective offset to the respective third point in time.

7. The media of claim 1, further comprising communicating, to each unanchored small cell site in the cluster, a PTP sync message from the host site that indicates, in the {correction_field} of the PTP sync message, the respective adjusted DCO.

8. The media of claim 1, wherein the cluster is comprised of the unanchored small cell sites proximately positioned to each other.

9. A method for determining a respective adjusted dynamic corrective offset for each unanchored small cell site in a cluster, the method comprising:
continuously measuring, in an asymmetric network without on-path support, one-way delay down (OWDd) and delay offset down from a host site to an anchored site and one-way delay up (OWDu) and delay offset up from the anchored site to the host site;
continuously measuring a respective round trip (RT) delay from the host site to each unanchored small cell site in a cluster;
determining a respective one-way delay down prime (OWDd') for each unanchored small cell site in the cluster by applying the ratio of OWDu/OWDd to the respective RT delay;
communicating, to each unanchored small cell site in the cluster, a PTP sync message from the host site that includes a time stamp indicating a respective point in time the host site sent the PTP sync message, the time stamp being ignored by each unanchored small cell site in the cluster and the PTP sync message being received by each unanchored small cell site in the cluster at a respective second point in time;
determining a respective adjusted dynamic corrective offset (DCO) for each unanchored small cell site in the cluster by adding the respective OWDd' to the time stamp and the delay offset down; and
communicating to each unanchored small cell site in the cluster a PTP follow-up message from the host site indicating the respective adjusted DCO, the PTP follow-up message being received at a respective third point in time.

10. The method of claim 9, further comprising determining a respective corrective offset for each unanchored small cell site in the cluster by subtracting the respective second point in time from the respective adjusted DCO.

11. The method of claim 10, further comprising determining a respective offset corrected time for each unanchored small cell site in the cluster by adding the respective corrective offset to the respective third point in time.

12. The method of claim 9, wherein each of the host site and the anchored site has a Primary Reference Timing Clock (PRTC) that is traceable and synchronous to a common clock.

13. The method of claim 9, wherein each of the anchored and unanchored small cell sites is identified by media access control (MAC) address.

14. The method of claim 9, wherein each of the anchored and unanchored small cell sites is identified by internet protocol (IP) address.

15. A computer system for determining a respective adjusted dynamic corrective offset for each unanchored small cell site in a cluster comprising:
a processor; and
a computer storage medium storing computer-useable instructions that, when used by the processor, cause the processor to:
continuously measure, in an asymmetric network without on-path support, one-way delay down (OWDd) and delay offset down from a host site to an anchored site and one-way delay up (OWDu) and delay offset up from the anchored site to the host site to determine a respective adjusted dynamic corrective offset (DCO) for each unanchored small cell site in a cluster, the respective adjusted DCO being unique for each unanchored small cell site in the cluster, wherein each of the host site and the anchored site has a Primary Reference Timing Clock (PRTC) that is traceable and synchronous to a common clock;
continuously measure a respective round trip (RT) delay from the host site to each unanchored small cell site in the cluster;
apply the respective adjusted DCO to PTP messages communicated from the host site to each unanchored small cell site in the cluster; and
communicate, to each unanchored small cell site in the cluster, a PTP sync message that indicates a respective point in time the PTP sync message is communicated from the host site, wherein the point in time in the PTP sync message is ignored by each unanchored small cell site in the cluster, and a PTP follow-up message is communicated to each unanchored small cell site in the cluster from the host site that includes the respective adjusted DCO, the PTP sync message being received at a respective second point in time and the PTP follow-up message being received at a respective third point in time, wherein the respective adjusted DCO comprises a sum of the respective point in time, a respective OWDd', and the delay offset down.

16. The computer system of claim 15, wherein the respective adjusted DCO is communicated in the {correction_field} of the PTP sync message to each unanchored small cell site in the cluster.

17. The computer system of claim 16, wherein a respective OWDd' is determined for each unanchored small cell site in the cluster by applying the ratio of OWDu/OWDd to the respective RT delay for each unanchored small cell site in the cluster.

18. The computer system of claim 15, wherein the respective OWDd' is determined for each unanchored small cell site in the cluster by applying the ratio of OWDu/OWDd to the respective RT delay for each unanchored small cell site in the cluster.

19. The computer system of claim 18, wherein a respective corrective offset is determined for each unanchored small cell site in the cluster by subtracting the respective adjusted DCO from the respective second point in time and a respective offset corrected time is determined for each unanchored small cell site in the cluster by adding the respective corrective offset to the respective third point in time.

\* \* \* \* \*